Patented Aug. 20, 1940

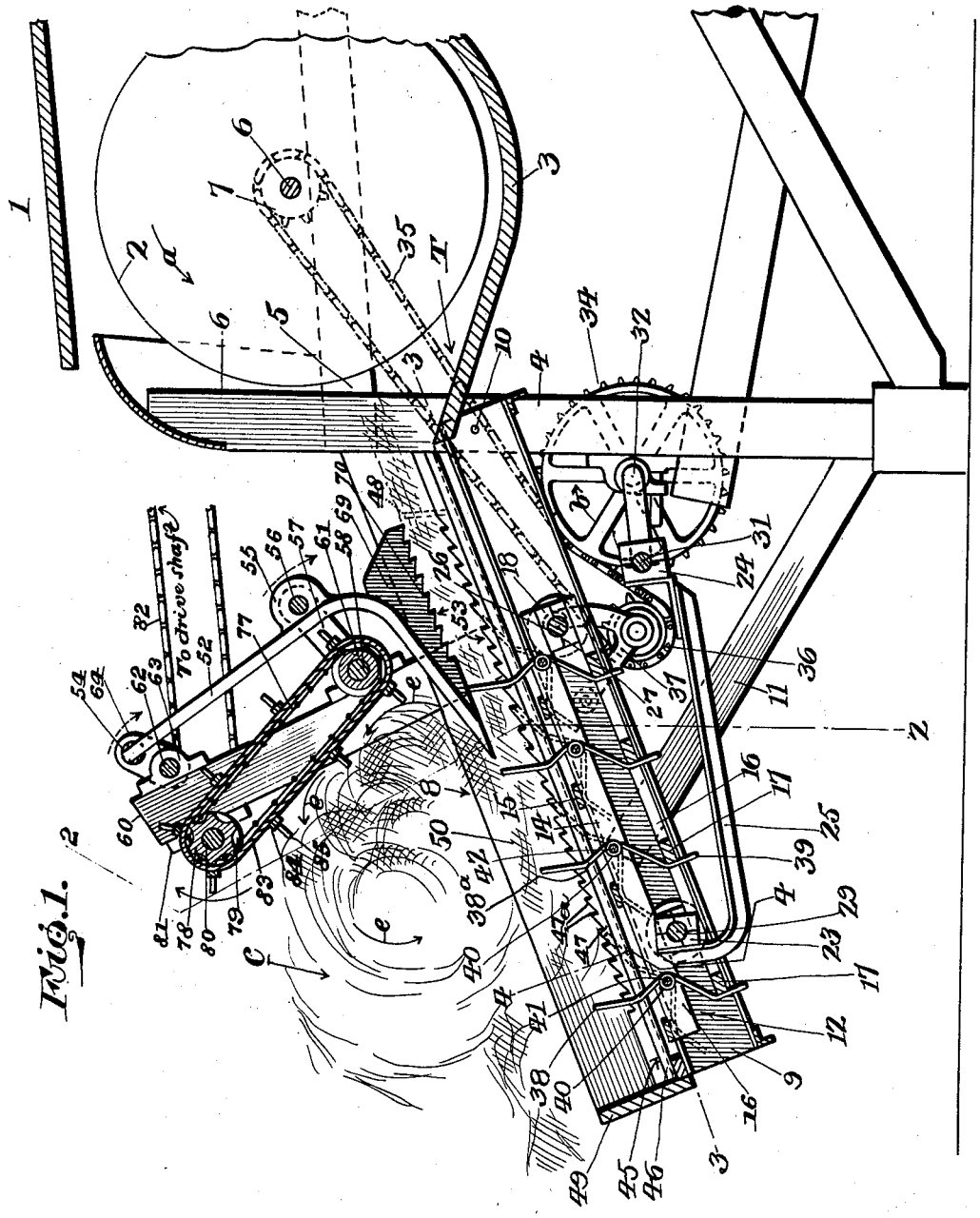

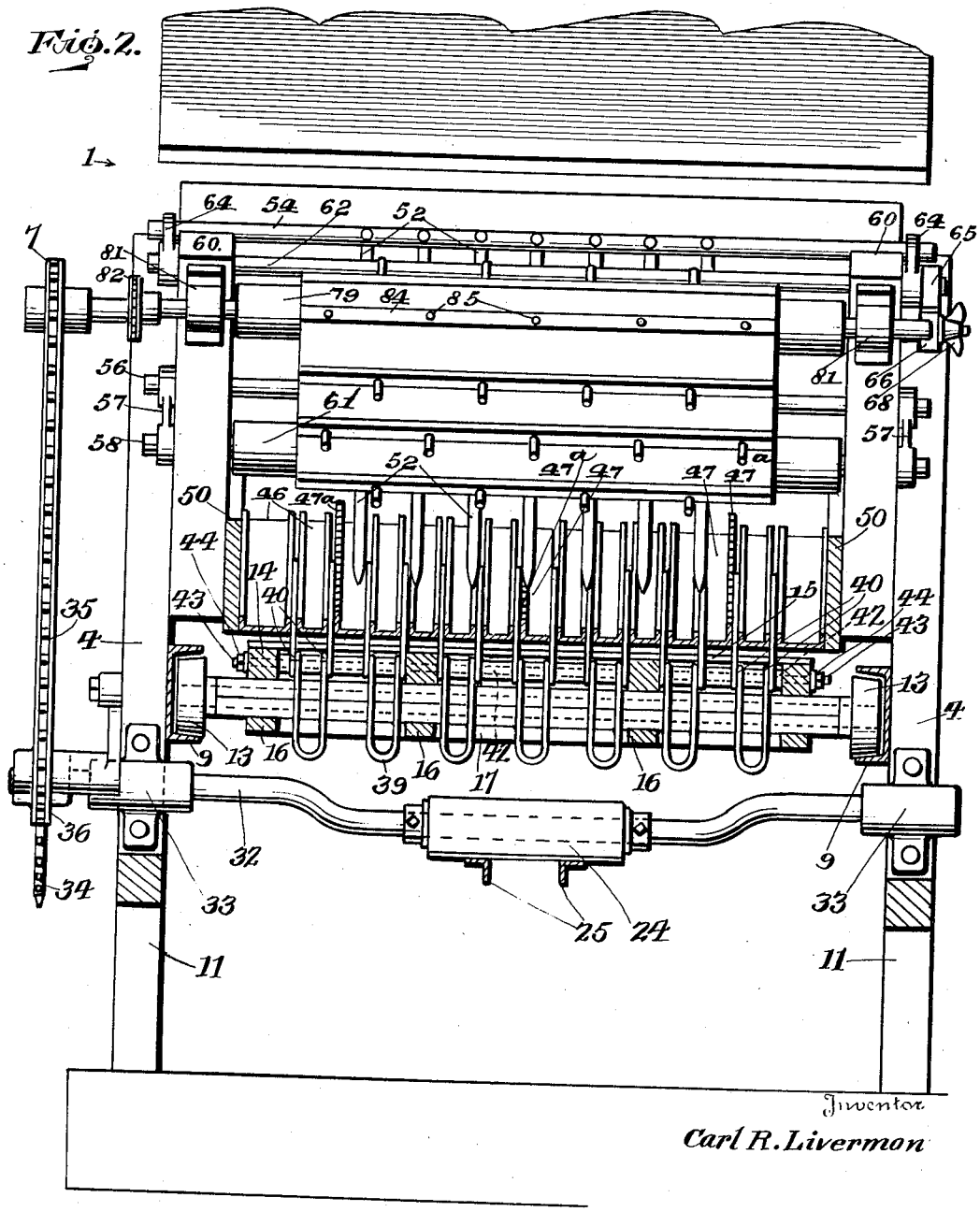

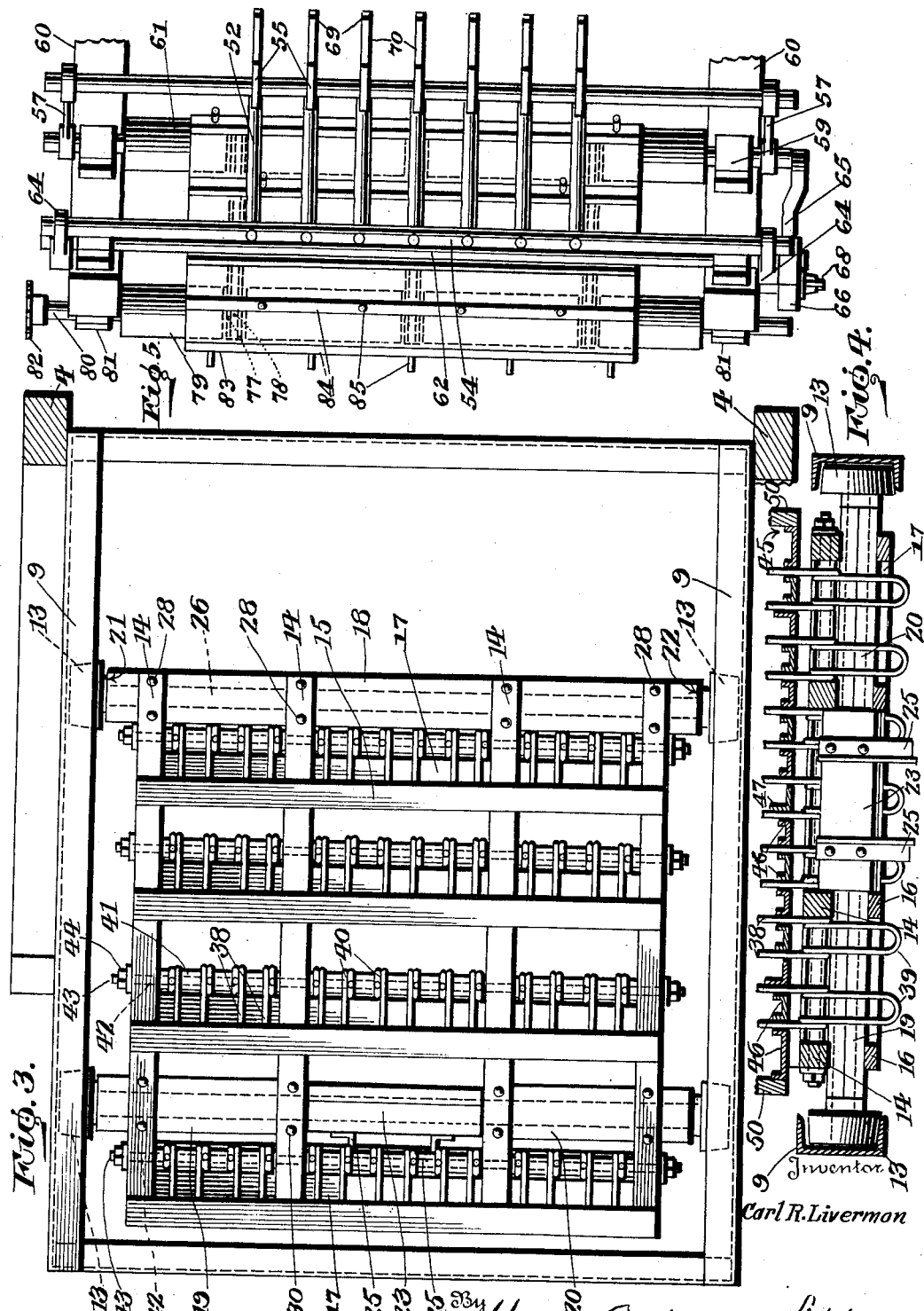

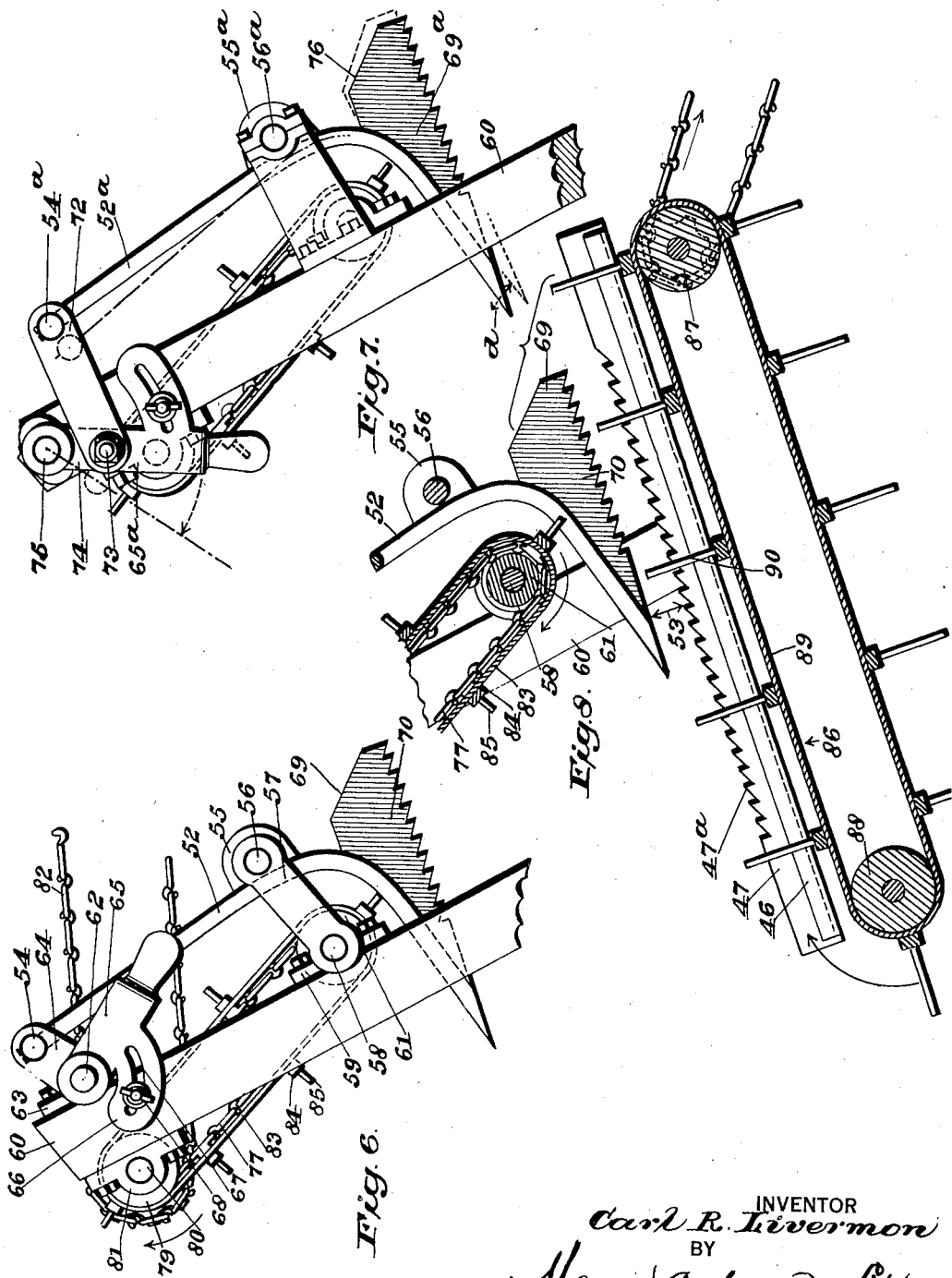

2,212,296

UNITED STATES PATENT OFFICE 2,212,296

FEEDER FOR THRESHING MACHINES

Carl R. Livermon, Roxobel, N. C.

Application October 6, 1937, Serial No. 167,661

11 Claims. (Cl. 130—27)

This invention relates to improvements in threshing machines, but more particularly in feeding contrivances therefor, and its objects are as follow:

First, to provide a mechanical feeder attachment for peanut vine and other material threshing machines which, in addition to eliminating the uncertainty of manual labor, feeds the thresher cylinder with amounts of such uniformity that choking and stalling are prevented.

Second, to provide a feeder attachment which will card or comb off a layer of the desired depth from a mass of material, no matter how large the latter may be within reason, and continuously feed the layer to the cylinder of the threshing machine.

Third, to provide a feeder which will supply the thresher cylinder with only the desired amount of material and no more, this on the premise that the supply of material is in excess of the quantity that the thresher could take in its normal operation.

Fourth, to provide a feeder which has a feeder frame that is movable in a prescribed path, and has fingers which coact with stationary tines across the points of which the fingers perform both a tearing or carding action as well as a pushing action on the mass of vines or other material to be threshed.

Other objects and advantages will appear in the following specification, reference being had to the accompanying drawings, in which:

Figure 1 is a longitudinal sectional view of the feeder, illustrating its association with a known type of threshing machine.

Figure 2 is a vertical section taken substantially on the line 2—2 of Figure 1.

Figure 3 is a horizontal section taken on the line 3—3 of Figure 1, principally illustrating the feeder frame.

Figure 4 is a cross section taken on the line 4—4 of Fig. 1.

Figure 5 is a detail plan view of a portion of the feeder attachment.

Figure 6 is a side elevation confined to the intercepting means of the feeder attachment.

Figure 7 is a partially sectional and elevational view of a slight modification of the intercepting means.

Figure 8 is a sectional view illustrating the combination of a uni-directionally driven conveyor with the intercepting means.

The instant feeder is intended to serve as a mechanical attachment to peanut vine threshing machines. While this use is given as an example, the statement is not to be construed as restricting the application of the attachment because its specific structure, and much more its underlying principle, adapts it to any machine which has to do with the handling of a mass of loose material from which predetermined amounts must be torn off and fed to the point of treatment.

To make this plain, as regards a peanut vine threshing machine, the current practice is for a laborer to pitch quantities of vines onto the feed board where the vines collect in rather large masses. The machine has an attendant who tears off quantities of the vines and stuffs them into the feed throat of the threshing machine. Inasmuch as this manner of feeding depends upon human judgment the supply to the thresher cylinder is bound to lack uniformity. There will be times when the attendant feeds less than the thresher cylinder can handle. At other times he will feed more, whereupon the machine will be unnecessarily strained to the point of choking and stalling.

The feeder attachment is so made that it can be given any one of a number of settings. At each setting, equivalent amounts of vine will be fed in, the remainder of the vine mass being turned over in a local area, to be handled later. All this will be made plain in the following description, to which attention is now invited.

Only a small portion of a peanut threshing machine 1 is shown. The thresher cylinder is diagrammatically represented at 2, the slotted concave with which its unshown teeth cooperate being designated 3, a pair of the frame posts 4, and certain side boards 5. The latter have associated bearings (not shown) in which the shaft 6 of the cylinder 2 is journalled. This shaft has a drive sprocket 7 (Fig. 2) secured to it.

The feeder attachment is generally designated 8. It consists of a pair of channel irons 9 (Fig. 2) which are placed so that the flanges confront each other. These channels are attached to the posts 4 at 10 (Fig. 1) and are braced at 11 so as to retain a fixed and inclined position. Whether or not to make the braces 11 adjustable and the determination of the pitch of the channels 9 are matters that are readily attended to in setting up the attachment.

The feeder frame 12 is guided in its reciprocatory movements by the channels 9, the bottom flanges of which provide tracks for the wheels 13 of the frame (Figs. 2 and 3). This frame consists of a series of longitudinal top bars 14 which are crossed by slats 15 which provide stops. The entire series of longitudinal bottom bars 16 includes suitably interconnected cross slats 17 which also provide stops.

There is a space between the two series of bars, and this space is maintained at the upper and right end of the feeder frame by a bearing block 18 (Fig. 1), and at a place adjacent to the lower and left end by a pair of bearing blocks 19, 20 (Fig. 4). The bearing block 18 is continuous between the points 21, 22 (Fig. 3). The bearing blocks 19, 20, are relatively short (Fig. 4), the place where they are spaced in the center being occupied by the bearing head 23 of the pair of bearing heads 23, 24 of a pitman structure 25. Said structure comprises twin angle members (Fig. 2), the ends of which are suitably secured to the respective bearing heads.

A shaft 26 extends longitudinally of the bearing block 18 and this block is longitudinally divided at 27 to facilitate the emplacement of the shaft. This block is preferably made of wood because it has been found that a bearing made of this material is not only cheaper than if made of metal but answers every other requirement. The halves of the bearing block 18 can either be clamped against the shaft 26 by the securing means 28 with which the top and bottom bars 14, 16 are attached, or the shaft can be permitted to turn in the bearing block. In the first instance the wheels 13 must run loose on the ends of the shaft 26. In the second instance the wheels are affixed to the ends of the shaft.

There is a similar set-up at the lower end of the feeder attachment. Here a shaft 29 extends through from side to side, carrying a set of wheels on its ends, these either being loose or fast, depending on whether the divided blocks 19, 20 (Fig. 4) are clamped onto the shaft or whether the latter is permitted to turn. Securing means 30 go through the top and bottom bars 14, 16, as well as the halves of the bearings 19, 20.

The bearing heads 23, 24, are constructed on a plan similar to that of the previously mentioned bearing blocks. Said heads are preferably made of wooden halves, which are suitably held assembled around the central part of the respective shaft 29 and the crank 31 of a crank shaft 32 (Fig. 2). This shaft is journalled in bearings 33 which are secured to the posts 4. One end of it carries a driven sprocket 34. The lower flight of a chain 35 is meshed with a portion of the rim of the sprocket 34. This chain runs between the drive sprocket 7 and between an idler sprocket 36 which is supported by an adjustable bearing bracket 37.

Thus far the reader will readily understand that as the thresher cylinder 2 is rotated counter-clockwise (arrow a, Fig. 1) the crank 31 will rotate clockwise (arrow b). The feeder attachment 8 will partake of a straight-line reciprocatory motion between its guide means, comprising the channels or tracks 9, and this motion will continue without variation as long as the thresher cylinder 2 is operated.

At this point it is desired to state that the driving arrangement shown is adopted mainly because of its simplicity. The crank shaft 32 does not have to be driven from the cylinder shaft 6 because power can be taken off elsewhere. Nor is it essential to employ a sprocket and chain arrangement. Any equivalent mechanical drive can be adopted.

The feeder attachment 8 has a plurality of loosely mounted steel fingers 38. These are shaped in the form of inverted hair pins (Fig. 2), being bent from single lengths of wire of sufficiently heavy gauge, the closed ends 39 being abuttable against the stop slats 17, their medial coils 40 being parts of their mounts. The latter include and are completed by pipes 41 upon which the coils 40 loosely turn. The fingers also have bends 38a adjacent to their free ends, the purpose of which is presently set out.

The previously mentioned pipes 41 are assembled in transverse series upon rods 42 which extend transversely of the feeder frame 12 (Fig. 2) and through the top bars 14 thereof (Fig. 1). The ends 43 of the rods are threaded (Fig. 2), and when the nuts 44 are drawn up tight, the pipes 41 will be fixed in position between the top bars 14 with respect to which they act as spacers, serving to give the feeder frame 12 the desired and necessary strength. The bottom ends of the fingers 38 are heavier than the top ends because of the added weight which the closures 39 (Fig. 2) afford. The normal tendency of the fingers is to gravitate to the upright and full line positions (Fig. 1).

Said fingers are also arranged in longitudinal series, that is to say, they are set in line in the up and down direction of the feeder attachment (Fig. 3). The fingers 38 protrude through the feed table 45 (Fig. 1), obviously to a greater extent on the upstroke (full lines) than on the return stroke (dotted lines). The position of the bends 38a in the fingers 38 is such that they come a little above the top line of the feed table on the upstroke during which the fronts of the bends push out of the slots any obstruction that might otherwise tend to work through the space between the slats. On the down stroke the backs of the bends of the fingers exercise the same function, pushing obstructions ahead of them out of the slots and again keeping the slots clear.

It was stated that the weight of the closures 39 cause the fingers to gravitate to the upright and full line positions (Fig. 1). The restoration of the fingers to these positions is also in a large measure the result of the slightly protruding tips of the fingers above the level of the feed table when in the lowered positions to catch into the material at the beginning of the upstroke. It is readily seen that when the upstroke begins the resistance of the material will elevate the fingers which then begin their pushing function. It is also important to note that the fingers are rigid both on the up and down strokes, being held so by the respective stops 17, 15. The rigidity of the fingers on both the up and down strokes is depended upon to rake out obstructions from and keep the slots clear.

Referring again to the feed table, this is now composed of a series of longitudinally placed channel and angle iron slats 46, 47, which are sufficiently spaced to provide working room for the fingers 38. The amplitude of movement of said fingers is equal to the throw of the crank 31, and the final position of the uppermost series of fingers being designed 48 (Fig. 1).

It is noted respecting Figs. 2 and 4 that the channel slats 46 are positioned with the flanges up. This arrangement yields the advantage of the troughs or gutters which the channels form, providing places down which dirt and stones can slide, preventing jamming in the spaces between channels and avoiding breakage of the teeth. The upright flanges of the angles 47 are toothed at 47a to check any tendency of the vine mass to slip back.

The feed table is converted into trough form by tail and side boards 49, 50 (Fig. 1). The latter abut the previously mentioned side boards 5 of the threshing machine, and make an uninterrupted inside surface. The channel iron construction of the feed table affords unusual strength because of the bracing function that the upstanding flanges affords. Being made of metal, the channels and angles are not subject to swelling and warping as are the inescapable results from a wood feed board.

A series of fairly heavy tines 52 is stationed crosswise of the attachment 8 at the highest point of the latter. These tines comprise parts of what is now described as an intercepting means for the vine mass, against which means said mass is propelled to tear off determined amounts for delivery into the thresher feed throat T. Said tines stand perfectly rigid, but they are adjustable to vary the size of the passage 53. This passage comprises the distance between the nethermost parts of the tines and the top of the feed table 45. All of the tines are commonly and rigidly connected at their upper ends to a cross shaft 54.

Each tine has an ear 55 on back, a shaft 56 being driven through the registering holes in the ears and welded or otherwise rigidly secured in place. The projecting ends of the shaft 56 have links 57 turnably attached to them, these links extending forwardly where they are similarly connected to a cross shaft 58.

The cross shaft 58 is held at its ends by brackets 59 which clamp the shaft to any convenient adjacent structure 60. This shaft provides the support for an idler roller 61. In this particular case the roller is made to turn on the shaft but in actual practice it is immaterial whether the roller turns on the shaft or the shaft turns in the brackets 59.

In the latter instance the roller would naturally be secured to the shaft and since the links 57 approximately stay in the positions shown the projecting ends of the shaft 58 would turn within the links. The latter can be prevented from slipping off of the shaft 56, 58 by the use of any conventional type of set collar or its equivalent.

Another cross shaft 62, which is held to the structure 60 by bearings 63, has arms 64 attached to its ends. These arms extend back and provide supports for the cross tine shaft 54. One end of the shaft 62 has a handle 65 secured to it. This handle has an extension 66 which is arcuately slotted at 67 on the radius of the shaft 62 and contains the screw bolt of a thumb screw 68 which enables setting the handle 65 and the tines 52 to any adjustment within the limits of the slot 67.

This adjustment comprises the raising and lowering of the tines in respect to the feed table. It is observed in Fig. 1 that each of the tines has a fin 69 which is toothed at 70 on its nether edge in confronting relationship to the feed table. The teeth of the fin sets prevent retrograde motion of the separated vine layer, and the wedge configuration resulting from the affixion of the fins on the slanting bottoms of the tines produces an effective cleavage of the material as it is forced upwards toward the intercepting means, said fins thereafter holding the separated layer down so that it will not buckle up or curl over upon itself, thereby insuring the feeding of a vine layer or strip of uniform depth.

Reverting to the matter of adjustment, it will be understood that the nether edges of the fins 69 as well as the points of the tines 52 virtually stay parallel to the feed table at every adjustment. There may be some instances in which a slight change in the manner of adjustment will be found to advantage, and although this is adopted sometimes, the principle remains the same, namely the propulsion of the vine mass up to and past the intercepting means to tear off a predetermined layer of vines.

Attention is directed to Fig. 7 respecting the latter slightly modified mode of adjustment. Here the structure 60 is provided with fixed brackets 71 in which the cross shaft 56a (equivalent to the shaft 56) is journalled. The ears 55a of the tines 52a are secured to this shaft, as before. The upper ends of the tines are commonly connected to the cross shaft 54a and this shaft has links 72 reaching forwardly to places of pivotal connection at 73 to each of a pair of arms 74 which are rigidly attached to a cross shaft 75. This cross shaft has an adjusting handle 65a secured to it, and it will be seen by comparing the structure with Fig. 6, that the method of setting the adjustments is identical.

The distinction of the suspension of the tines in Fig. 7 from the showing in Fig. 6 is that in Fig. 7 it is mainly the points of the tines that are adjusted up and down (arrow d), the heels 76 of the toothed fins 69a virtually staying in a fixed position. It will be remembered that in Fig. 6 the bottom line of the fins and tine points remain approximately parallel to the feed table during adjustment.

Reference is again made to the main form of the intercepting means (Figs. 1 and 6). The previously mentioned idler roller is appropriately grooved at places to make room for chains 77 which are driven by the sprocket sections or wheels 78 of a top roller 79. The roller is affixed to a cross shaft 80. The projecting ends of this shaft is journalled in bearings 81 on the structure 60, one of the projections carrying either a pulley or sprocket which has a drive connection 82 applied to it (Fig. 1), said connection going to any appropriately rotating part of the thresher.

The chains have a canvas belt 83 suitably secured thereto on the outsides. Cross slats 84 are secured to the chains on top of the belt and the cross slats have any type of pins 85 projecting therefrom.

The chain and belt arrangement 77, 83, together with the cross slats and pins, actually comprise a conveyor, but standing in the position that it does and functioning as illustrated, said arrangement is actually a live guard, the primary purpose of which is to avoid the collection of the vine mass on top of the tines in such volume as to clog the spaces between the tines. Said guard operates upwards and away from the tine points, keeping the latter desirably clear but not obstructing the tearing off function in the least.

It will be understood that according to the way feeder frame 12 reciprocates, it actually constitutes a conveyor. Instead of employing this reciprocatory conveyor without variation, there are instances in some installations wherein a more or less conventional uni-directionally movable conveyor can be used to advantage. This conveyor is designated 86 in Fig. 8. This view illustrates the combination of the previous intercepting means with a conveyor of the type just mentioned.

It is believed unnecessary to repeat the description of the interception means, the parts shown merely being identified by reference numerals which correspond with Fig. 1. But as regards the conveyor 86, this consists of drive means 87 and idler means 88 to which the conveyor web 89 is applied. It is not so material what the nature of this web is; it might comprise a series of chains or it might consist of a belt. The web has upstanding pins 90 which feed the material upwards toward the intercepting means.

The reason for specifically illustrating the arrangement in Fig. 8 is to make it plain herein that the principle of the invention does not rest on the specific showing in Fig. 1. The broad principle comprises the moving of a mass of vine material toward an intercepting device that is stationed across its path, the adjustment of the intercepting device in respect to a fixed floor being such that only the desired amount of the vine material will be combed off in the form of a layer to be fed to the feeder throat.

*The operation* is readily understood. Vines are forked onto the feed table 45 until a mass approximately as shown at c is built up. The reciprocatory feeder frame 12, or its equivalent feeder means 86 (Fig. 8) is operated to advance the vine mass toward the feed throat T. As regards the feeder frame 12, the fingers 38 are rigid on each forward stroke and rigid on each return stroke. The result of the combined functions of the feeder frame 12 and its fingers 38 is to advance the mass of material c periodically. The conveyor 86 (Fig. 8) advances the material in a steady stream.

The greater part of the mass is detained by the stationarily located tines 52 which constitute the intercepting means. Although these tines are stationarily located, they are also adjustable so as to vary the size of the passage 53. As the vine material is advanced, such amounts as are determined by the size of the passage 53 are torn off and delivered through the throat T to the threshed cylinder 62.

The main functions of the two uppermost transverse rows of fingers 38 is to do the tearing in conjunction with the tines, inasmuch as these rows actually pass the points of the tines 52. The other rows of fingers do not pass the tine points, consequently these mainly perform a pushing function. Here it is again noted that the pointed shanks of the tines are pitched on a slant upwards and away from the feed table. If the pointed shanks stood parallel to the feed table the vines would merely be threaded upon the tines. But standing on a pitch as they do, the widening space at the back, augmented by the attached fins 69, produces the desired cleavage and tearing apart. Emphasis is desired to be laid on the function of the fins 69. These, as already brought out, extend backwardly from the points of the tines 52. As the nethermost layer of material is advanced toward the throat T it undergoes a degree of compression by virtue of having to pass under the edges of the fins 69, and the resistance thus imposed upon the layer of material is a direct contribution toward the prevention of the layer curling back upon itself, principally beneath the tines, and thus forming an obstruction in advance of the throat T, the prevention of which is the underlying purpose of the invention. The teeth 70 so engage the layer of material beneath the fins as to hold said layer in place and prevent it from being pulled upwards by the conveyor 77, 83, thereby continuously tearing said layer from the vine mass and making sure that the layer will maintain a reasonably fixed volume.

It is to be noted that a layer of the material is combed off of the mass c for delivery to the feed throat T, the remainder of the mass when reaching the tines 52 being lifted by the guard 77, 83, and rolled over as generally denoted by the arrows e. Here the mass is circulated in a local area upon the feed table 45 until eventually delivered through the passage 53 to the feed throat.

I claim:

1. A feeder comprising vine feeder means, intercepting means situated above said feeder means and consisting of a series of tines being disposed at a pitch directed toward the feed end, fins on the undersides of the tines extending backward from the tine points, suspending means stationarily supporting the tine series and keeping the bottom edges of the fins approximately parallel to the feeder means, and means by which to adjust the suspending means to raise and lower the tine and fin series in respect to the feeder means, maintaining said approximate parallelism while varying the depth of the feed space between the feeder means and said edges.

2. A feeder comprising vine feeder means, intercepting means consisting of a series of tines, suspending means consisting of twin arm and link sets turnably but stationarily supporting the tine series above the feeder means, a structure on which the twin arm and link sets are pivoted, and means by which to turn the twin arm and link sets a limited amount thus to bodily raise and lower the tine series in respect to said feeder means.

3. A feeder comprising vine feeder means including a receiving end, intercepting means consisting of a series of curved tines, turnable suspending means for the tine series supporting said series above the feeder means, upstanding movable guard means having its lower end operating adjacent to the bend of the tines and its upper end pitched forwardly so as to approximately be over the receiving end of the feeder means, and means for bodily adjusting the suspending means and consequently the tine series in respect to the guard means and in respect to the feeder means.

4. A feeder comprising vine feeder means, intercepting means consisting of a series of bent tines, means which turnably but stationarily supports the series adjacent to the tine points, the points of the tines being situated over the feeder means, a structure by which the turnable supporting means is carried, and means connected to the other ends of the tines and carried by said structure for swinging the series upon said turnable supporting means, thereby raising and lowering the points of the tines in reference to the feeder means.

5. A feeder comprising vine feeder means, intercepting means consisting of a series of tines, two shafts by which the tines are secured together, a supporting structure and a pair of shafts mounted upon said structure, links joining the shafts in pairs and providing turnable but stationary suspension means for the tine series, means by which to turn one of the shafts thereby to raise and lower the tine series, a driven shaft journalled on the supporting structure, and guard means carried by the supporting structure in advance of the shaft pairs but above and in back of the tine points, said guard means being operated from said driven shaft, said guard means terminating at a place adjacent to the tines and serving to carry material away from the tine points.

6. A feeder comprising means for advancing a mass of material toward the throat of a threshing machine, intercepting means so situated in respect to the throat as to stand in the way of the advancing material including means to initially tear off only determined amounts of material for delivery into the throat, and means also embodied in the intercepting means but offset in back of and above the tearing means to overturn portions of the material not previously torn from the mass.

7. A feeder comprising feeder means by which to advance a mass of material, intercepting means toward which the feeder means moves said mass of material, means embodied in the intercepting means to initially cleave the material in a plane above the level of the feeder means, thus to separate a layer of uniform depth from the mass of material, means also embodied in the intercepting means projecting therefrom and overlying the mass to hold the layer down flat so that it will not curl back upon itself, and means further embodied in the intercepting means to deflect and locally circulate the mass from which the layer was separated.

8. A feeder comprising a vine feeder means movable in one direction from an entrance end thereof, a movable conveyor having one of its ends located adjacently to the feeder means and being pitched contrary to the direction of movement of the feeder means so that its other end overlies the feeder means in proximity to the entrance end thereof, and a series of tines situated in back of the conveyor extending around and under said one end of the conveyor and terminating in points in advance of said conveyor.

9. A feeder comprising a vine feeder means movable in one direction from an entrance end thereof, a movable conveyor having one of its ends located adjacently to the feeder means and being pitched contrary to the direction of movement of the feeder means so that its other end overlies the feeder means in proximity to the entrance end thereof, a series of tines situated in back of the conveyor extending around and under said one end of the conveyor and terminating in points in advance of said conveyor, and fins attached to said tines extending backwards from said points to overlie the feeder means and prevent the material from curling back upon itself.

10. A feeder comprising a movable vine feeder means, a movable conveyor having one of its ends contiguous to but spaced from said feeder means, and a series of members underlying the movable conveyor and therefore situated in the space between the feeder means and said contiguous end of the conveyor, said members being of an erect wedge configuration to spread an oncoming mass of material.

11. A feeder comprising a movable vine feeder means, a movable conveyor having one of its ends contiguous to but spaced from said feeder means, and a series of members underlying the movable conveyor and therefore situated in the space between said feeder means and the contiguous end of the conveyor, said members being of an erect wedge configuration to spread an oncoming mass of material and having their nether edges substantially parallel to the conveyor and serrated from front to back to exercise a retarding action on the material passing thereunder.

CARL R. LIVERMON.